US010594735B2

(12) United States Patent
Ramachandran et al.

(10) Patent No.: US 10,594,735 B2
(45) Date of Patent: Mar. 17, 2020

(54) TAG-BASED SECURITY POLICY CREATION IN A DISTRIBUTED COMPUTING ENVIRONMENT

(71) Applicant: AT&T Intellectual Property I, L.P., Atlanta, GA (US)

(72) Inventors: Jayaraman Ramachandran, Plainsboro, NJ (US); Rebecca Finnin, Atlanta, GA (US); Jason Godfrey, Volcano, CA (US); Craig Harvey, Apex, NC (US); Daniel Solero, Mooresville, IN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 165 days.

(21) Appl. No.: 15/718,347

(22) Filed: Sep. 28, 2017

(65) Prior Publication Data
US 2019/0098054 A1 Mar. 28, 2019

(51) Int. Cl.
*H04L 29/06* (2006.01)

(52) U.S. Cl.
CPC .................... *H04L 63/20* (2013.01)

(58) Field of Classification Search
CPC ....................................................... H04L 63/20
See application file for complete search history.

(56) References Cited

U.S. PATENT DOCUMENTS

| 6,836,885 | B1* | 12/2004 | Buswell | G06F 3/0481 |
| | | | | 717/172 |
| 8,955,036 | B2* | 2/2015 | Hugard, IV | H04L 63/104 |
| | | | | 726/1 |
| 9,444,820 | B2 | 9/2016 | Muppidi et al. | |
| 9,450,836 | B2* | 9/2016 | Hammer | H04L 41/50 |
| 9,576,147 | B1* | 2/2017 | McClintock | H04L 63/1433 |
| 9,608,809 | B1* | 3/2017 | Ghetti | H04L 9/083 |
| 9,614,670 | B1 | 4/2017 | Ghetti et al. | |
| 9,648,040 | B1* | 5/2017 | Morkel | H04L 63/20 |
| 9,680,846 | B2 | 6/2017 | Haugsnes | |
| 9,680,872 | B1* | 6/2017 | Roth | H04L 63/20 |
| 9,710,482 | B2 | 7/2017 | Fitzgerald et al. | |
| 9,712,535 | B1 | 7/2017 | Rossman | |
| 9,762,616 | B2* | 9/2017 | Nagaratnam | H04L 63/20 |
| 9,854,001 | B1* | 12/2017 | Roth | H04L 63/20 |
| 9,935,937 | B1* | 4/2018 | Potlapally | H04L 63/0823 |
| 10,164,944 | B1* | 12/2018 | Felstaine | H04L 63/0428 |

(Continued)

*Primary Examiner* — Joseph P Hirl
*Assistant Examiner* — Stephen T Gundry
(74) *Attorney, Agent, or Firm* — Hartman & Citrin LLC

(57) ABSTRACT

Concepts and technologies are disclosed herein for tag-based security policy creation in a distributed computing environment. A security management module can receive an inventory event that relates to instantiation of a service. The security management module can identify the service that was instantiated and obtain a tag set that relates to the service. The tag set can include security tags that include a string that identifies a communications link associated with the entities included in the service that was instantiated. The security management module can identify policy rules associated with the security tags. The policy rules can define security for the service that was instantiated. The security management module can compute a security policy for the service and can provide the security policy to the computing environment for implementation.

20 Claims, 7 Drawing Sheets

(56) References Cited

U.S. PATENT DOCUMENTS

| | | | | |
|---|---|---|---|---|
| 10,172,180 | B1* | 1/2019 | Huang | H04L 43/12 |
| 2006/0282253 | A1* | 12/2006 | Buswell | G06F 3/1454 |
| | | | | 703/22 |
| 2016/0259946 | A1 | 9/2016 | Mardikar et al. | |
| 2016/0373474 | A1* | 12/2016 | Sood | H04L 63/1425 |
| 2017/0041296 | A1* | 2/2017 | Ford | G06F 16/951 |
| 2017/0093913 | A1 | 3/2017 | Summers et al. | |
| 2017/0163686 | A1 | 6/2017 | Diehl et al. | |
| 2017/0180423 | A1 | 6/2017 | Nimmagadda et al. | |
| 2017/0223026 | A1* | 8/2017 | Amiri | H04L 63/123 |
| 2017/0223057 | A1* | 8/2017 | Amiri | H04L 63/20 |
| 2017/0331832 | A1* | 11/2017 | Lander | H04L 63/102 |
| 2018/0176255 | A1* | 6/2018 | Bansal | H04L 63/20 |
| 2018/0234459 | A1* | 8/2018 | Kung | H04L 63/20 |
| 2018/0295036 | A1* | 10/2018 | Krishnamurthy | H04L 63/20 |
| 2018/0316676 | A1* | 11/2018 | Gilpin | H04L 9/088 |
| 2018/0337931 | A1* | 11/2018 | Hermoni | H04L 63/123 |
| 2019/0068619 | A1* | 2/2019 | Fan | H04L 63/1416 |
| 2019/0095230 | A1* | 3/2019 | Glessner | G06F 9/45558 |

* cited by examiner

TAG-BASED SECURITY POLICY CREATION IN A DISTRIBUTED COMPUTING ENVIRONMENT

BACKGROUND

The methods and technologies for creating, updating, and delivering applications and services have evolved over the past several years. Whereas in the past network operators would primarily create and deliver new services by deploying custom hardware loaded with custom software, the modern moves toward network virtualization has enabled network operators to create and provide services on new types of platforms with drastically shortened time-to-market and/or time-to-live goals.

For example, the European Telecommunications Standards Institute ("ETSI") network functions virtualization ("NFV"), software defined networking ("SDN"), and other "cloud" computing architectures and technologies have resulted in a change to the traditional hardware-software model by enabling network operators to create and deploy services on commercial-off-the-shelf ("COTS") hardware instead of the custom hardware and custom software combinations relied on in years past. This move can enable flexibility in terms of scaling, locating, and/or using the services. While virtualization may provide flexibility to network operators and other entities, several challenges pose difficulties in migrating services to virtualized networks.

With the rapidly evolving nature of networks, has come an accompanying rapidly evolving nature of security needs and considerations. Whereas custom hardware and/or software may have been located in a protected physical environment in years past, the new model of virtualization means that many custom applications and/or services can be deployed to network-accessible hardware, thereby enabling hacking or other malicious activities via network access (instead of physical access). Because the security needs for a particular network can evolve quickly, application or service creators may not be able to plan for every possible security risk for a particular application or service, resulting in constantly emerging vulnerabilities that may not be addressed at service creation time.

SUMMARY

The present disclosure is directed to tag-based security policy creation in a distributed computing environment. An orchestration platform can receive, from a requestor or other entity, a request such as a service request. The service request can correspond to a request to create a service, a request to deploy an instance of an existing service, a request to activate a service, a request to scale a service, combinations thereof, or the like. The orchestration platform can access service recipes. In some embodiments, the service recipes can be stored at a design and modeling module. The orchestration platform can identify a recipe associated with the service that relates to the service request. The recipe can specify one or more entities that are used to provide the service. The recipe also can include and/or can reference tags associated with each entity identified in the recipe. The orchestration platform can use the recipe to create the service. The orchestration platform also can update the inventory to reflect the new service (and/or components thereof) and can generate (e.g., via the inventory management module and/or the event management module), an inventory event that can be provided to the security management platform. Thus, inventory management according to various embodiments of the concepts and technologies disclosed herein can support multiple methods of communication including publishing/subscribe models and command/response models of communication.

The security management platform can receive the inventory event. In some embodiments the inventory event can include tags associated with each entity that is reflected by the inventory event. In some other embodiments, the tags may not be provided with the inventory event and instead the security management platform can receive the inventory event, identify a service (e.g., the service) that relates to the inventory event, access the recipes (directly or indirectly) to identify entities associated with the service, and identify, based on the identities of the entities, the tags. In either method of identifying the tags, the security management platform can modify the tags by supplementing the tags with default tags (if any), by removing duplicates among the tags and/or by resolving conflicts among the tags, by identifying tags via relationships among the tags and/or the entities, combinations thereof, or the like. Thus, the security management platform can generate a final tag set.

The security management platform can analyze the tags in the final tag set and access one or more policy rules that relate to the tags in the final tag set. The security management platform can access a policy management module to obtain the policy rules, e.g., based on tag identifiers, keys, or the like in the final tag set. The security management platform can receive a set of policy rules that relate to the final set of tags, and can compute a security policy based on the final set of policy rules. The security management platform can provide the security policy to the computing environment, and the computing environment can apply the security policy to the service. Embodiments of the concepts and technologies disclosed herein also enable updating of the security policy at any time. In particular, the security management platform can be configured to update the security policy in response to detecting a change in a tag (e.g., by receiving a tag update); in response to receiving a policy rule update event; or the like. The updated security policy can be created in a similar manner and provided to the computing environment. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include receiving, from an orchestration platform, an inventory event that can relate to instantiation of a service at a computing environment. The operations also can include identifying, based on information included in the inventory event, the service that was instantiated and obtaining, based on information included in the inventory event, a tag set for the service. The tag set can include two or more of security tags. Each of the two or more security tags can include a string that identifies a communications link associated with the entities included in the service that was instantiated. The operations also can include identifying, based on the tag set, policy rules associated with the two or more of security tags. The policy rules can be identified by accessing a policy database using identifiers associated with the two or more of security tags. The policy rules can define security for the service that was instantiated. The operations also can include computing, based on the policy rules, a security policy for the service; and providing the security policy to the computing environment for implementation.

In some embodiments, obtaining the tag set can include receiving the tag set with the inventory event. In some embodiments, obtaining the tag set can include receiving, with the inventory event, information that identifies the service that was instantiated; accessing recipes to identify a recipe associated with the service; determining, based on the recipe, entities included in the service; and identifying, based on the entities, tags associated with the service. In some embodiments, the computer-executable instructions, when executed by the processor, can cause the processor to perform operations further including receiving, from the orchestration platform, a tag event that indicates that a security tag of the two or more security tags has been updated; identifying services that have security policies that relate to the security tag, the services including the service; updating security policies for the services identified, the security policies including the security policy; and providing an updated security policy to the computing environment for implementation.

In some embodiments, the security tag can be updated based on feedback from the computing environment. In some embodiments, the policy database can be updated based on feedback from the computing environment. In some embodiments, the computer-executable instructions, when executed by the processor, can cause the processor to perform operations further including: receiving, from the orchestration platform, a policy rule update event that indicates that one of the policy rules has been updated; identifying tags that relate to the one of the policy rules; identifying services that have security policies that relate to the one of the policy rules, the services including the service; updating security policies for the services identified, the security policies including the security policy; and providing an updated security policy to the computing environment for implementation.

According to another aspect of the concepts and technologies disclosed herein, a method is disclosed. The method can include receiving, from an orchestration platform and at a computing platform including a processor that executes a security management module, an inventory event that relates to instantiation of a service at a computing environment. The method also can include identifying, by the processor and based on information included in the inventory event, the service that was instantiated; and obtaining, by the processor and based on information included in the inventory event, a tag set for the service. The tag set can include two or more of security tags and each of the two or more of security tags can include a string that identifies a communications link associated with the entities included in the service that was instantiated. The method also can include identifying, by the processor and based on the tag set, policy rules associated with the two or more of security tags. The policy rules can be identified by accessing a policy database using identifiers associated with the two or more of security tags. The policy rules can define security for the service that was instantiated. The method also can include computing, by the processor and based on the policy rules, a security policy for the service; and providing, by the processor, the security policy to the computing environment for implementation.

In some embodiments, obtaining the tag set can include receiving the tag set with the inventory event. In some embodiments, obtaining the tag set can include: receiving, with the inventory event, information that identifies the service that was instantiated; accessing recipes to identify a recipe associated with the service; determining, based on the recipe, entities included in the service; and identifying, based on the entities, tags associated with the service. In some embodiments, the method further can include receiving, from the orchestration platform, a tag event that indicates that a security tag of the two or more of security tags has been updated; identifying services that have security policies that relate to the security tag, the services including the service; updating security policies for the services identified, the security policies including the security policy; and providing an updated security policy to the computing environment for implementation.

In some embodiments, the security tag can be updated based on feedback from the computing environment. In some embodiments, the policy database can be updated based on feedback from the computing environment. The updates can include updates from third parties and/or third party intelligence sources as well. In some embodiments, the computer-executable instructions, when executed by the processor, can cause the processor to perform operations further including receiving, from the orchestration platform, a policy rule update event that indicates that one of the policy rules has been updated; identifying tags that relate to the one of the policy rules; identifying services that have security policies that relate to the one of the policy rules, the services including the service; updating security policies for the services identified, the security policies including the security policy; and providing an updated security policy to the computing environment for implementation.

According to yet another aspect of the concepts and technologies disclosed herein, a computer storage medium is disclosed. The computer storage medium can store computer-executable instructions that, when executed by a processor, cause the processor to perform operations. The operations can include receiving, from an orchestration platform, an inventory event that relates to instantiation of a service at a computing environment; identifying, based on information included in the inventory event, the service that was instantiated; and obtaining, based on information included in the inventory event, a tag set for the service. The tag set can include two or more of security tags. Each of the two or more security tags can include a string that identifies a communications link associated with the entities included in the service that was instantiated. The operations also can include identifying, based on the tag set, policy rules associated with the two or more of security tags. The policy rules can be identified by accessing a policy database using identifiers associated with the two or more of security tags. The policy rules can define security for the service that was instantiated. The operations also can include computing, based on the policy rules, a security policy for the service; and providing the security policy to the computing environment for implementation.

In some embodiments, the policy database can be updated based on feedback from the computing environment. In some embodiments, the computer-executable instructions, when executed by the processor, can cause the processor to perform operations further including receiving, from the orchestration platform, a policy rule update event that indicates that one of the policy rules has been updated; identifying tags that relate to the one of the policy rules; identifying services that have security policies that relate to the one of the policy rules, the services including the service; updating security policies for the services identified, the security policies including the security policy; and providing an updated security policy to the computing environment for implementation.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
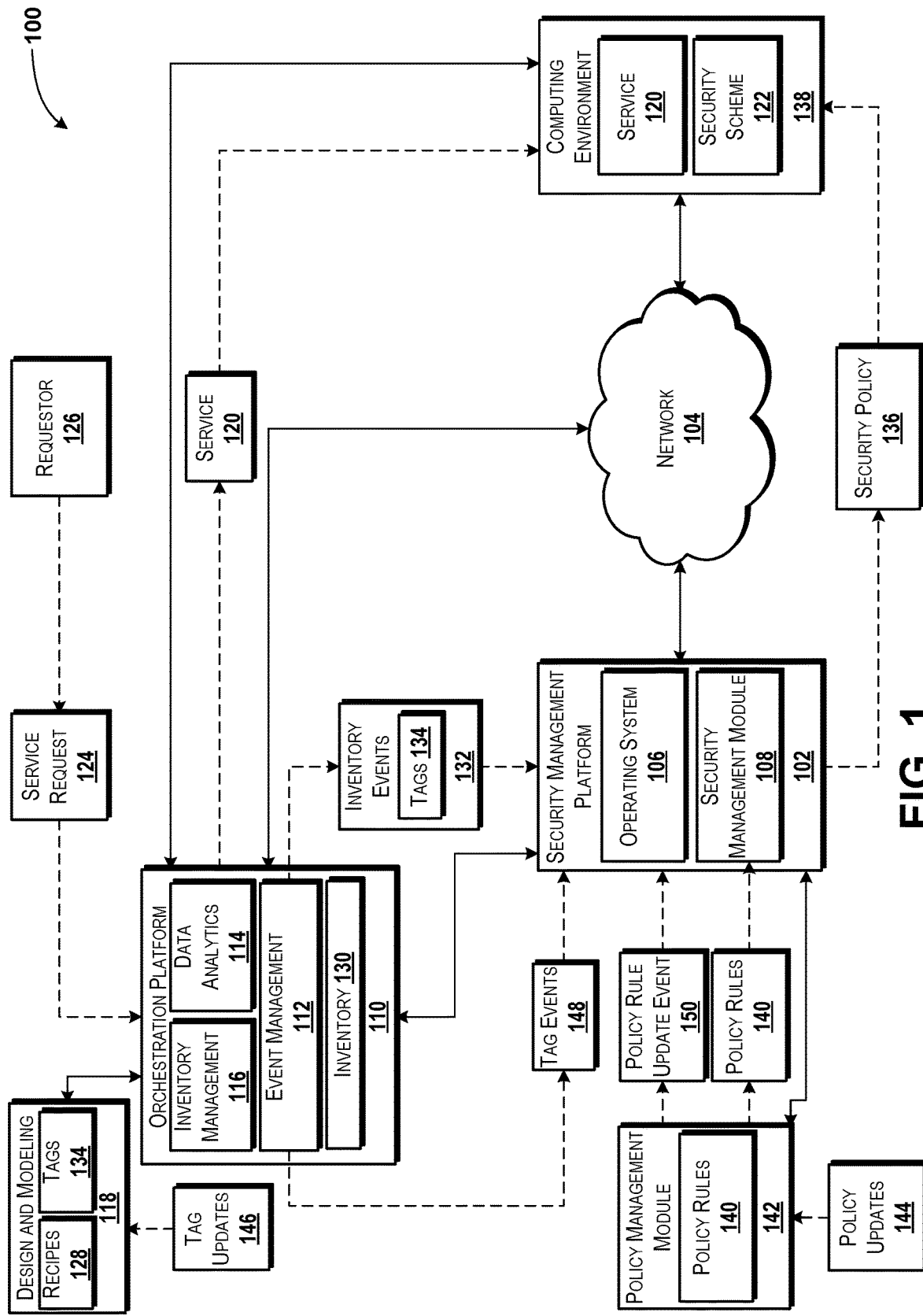
FIG. 1 is a system diagram illustrating an illustrative operating environment for various embodiments of the concepts and technologies described herein.

The following detailed description is directed to tag-based security policy creation in a distributed computing environment. An orchestration platform can receive, from a requestor or other entity, a request such as a service request. The service request can correspond to a request to create a service, a request to deploy an instance of an existing service, a request to activate a service, a request to scale a service, combinations thereof, or the like. The orchestration platform can access service recipes. In some embodiments, the service recipes can be stored at a design and modeling module. The orchestration platform can identify a recipe associated with the service that relates to the service request. The recipe can specify one or more entities that are used to provide the service. The recipe also can include and/or can reference tags associated with each entity identified in the recipe. The orchestration platform can use the recipe to create the service. The orchestration platform also can update the inventory to reflect the new service (and/or components thereof) and can generate (e.g., via the inventory management module), an inventory event that can be provided to the security management platform.

The security management platform can receive the inventory event. In some embodiments the inventory event can include tags associated with each entity that is reflected by the inventory event. In some other embodiments, the tags may not be provided with the inventory event and instead the security management platform can receive the inventory event, identify a service (e.g., the service) that relates to the inventory event, access the recipes (directly or indirectly) to identify entities associated with the service, and identify, based on the identities of the entities, the tags. In either method of identifying the tags, the security management platform can modify the tags by supplementing the tags with default tags (if any), by removing duplicates among the tags and/or by resolving conflicts among the tags, by identifying tags via relationships among the tags and/or the entities, combinations thereof, or the like. Thus, the security management platform can generate a final tag set.

The security management platform can analyze the tags in the final tag set and access one or more policy rules that relate to the tags in the final tag set. The security management platform can access a policy management module to obtain the policy rules, e.g., based on tag identifiers, keys, or the like in the final tag set. The security management platform can receive a set of policy rules that relate to the final set of tags, and can compute a security policy based on the final set of policy rules. The security management platform can provide the security policy to the computing environment, and the computing environment can apply the security policy to the service. Embodiments of the concepts and technologies disclosed herein also enable updating of the security policy at any time. In particular, the security management platform can be configured to update the security policy in response to detecting a change in a tag (e.g., by receiving a tag update); in response to receiving a policy rule update event; or the like. The updated security policy can be created in a similar manner and provided to the computing environment. It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for tag-based security policy creation in a distributed computing environment will be described, according to an illustrative embodiment. The operating environment 100 shown in FIG. 1 includes a security management platform 102. The security management platform 102 can operate in communication with and/or as part of a communications network ("network") 104, though this is not necessarily the case.

According to various embodiments, the functionality of the security management platform 102 may be provided by one or more server computers, one or more desktop computers, one or more laptop computers, one or more other computing systems, and the like. It should be understood that the functionality of the security management platform 102 can be provided by a single device, by two similar devices, and/or by two or more dissimilar devices. Furthermore, in some embodiments the functionality of the security management platform 102 can be provided by one or more devices associated with a distributed computing environment and/or storage and processing resources hosted thereon or otherwise provided thereby, as will be explained in more detail below with reference to FIG. 7. For purposes of describing the concepts and technologies disclosed herein, the security management platform 102 is described herein as a server computer. It should be understood that this embodiment is illustrative, and should not be construed as being limiting in any way.

The security management platform 102 can execute an operating system 106 and one or more application programs such as, for example, a security management module 108. The operating system 106 can include a computer program for controlling the operation of the security management platform 102. The security management module 108 can include one or more executable programs that can be configured to execute on top of the operating system 106 to provide various functions as illustrated and described herein. The functionality of the security management module 108 will be explained in detail after introducing other components of the operating environment 100.

The security management platform 102 can communicate, directly or via the network 104, with an orchestration platform 110. The orchestration platform 110 can include and/or can be in communication with an event management module, function, device, or other functionality ("event management module") 112, a data analytics module, function, device, or other functionality ("data analytics module") 114, an inventory management module, function, device, or other functionality ("inventory management module") 116, and a design and modeling module, function, device, or other functionality ("design and modeling module") 118. In some embodiments, these and/or other modules such as the modules 112, 114, 116, 118 can operate as components of the orchestration platform 110 and/or can be interacted with by the orchestration platform 110 to create, modify, monitor, and/or terminate a service, process, application, routine, or the like ("service") 120, as well as to create, implement, modify, and/or terminate a security scheme 122, as will be explained in more detail below.

In particular, the orchestration platform 110 can be configured to receive or otherwise obtain a service request 124. The service request 124 can be received, in some embodiments, from a requestor 126 such as an application, a user, a network operator, a device, or another entity. The service request 124 can request creation or instantiation of the service 120, in some embodiments. In some other embodiments, the service request 124 can request a modification or termination of an existing service 120. The orchestration platform 110 can be configured to analyze the service request 124 to determine one or more entities that will be included in the service 120. For example, the orchestration platform 110 can identify one or more virtual machines, one or more virtual network functions, one or more instances of network transport, one more resources, combinations thereof, or the like, that will be used to provide the functionality associated with the service 120 being requested for creation, modification, termination, or the like, by way of the service request 124.

To identify the one or more entities associated with the service 120, the orchestration platform 110 can be configured to obtain a recipe 128. One or more recipes 128 can be stored at or in communication with the design and modeling module 118. The recipe 128 can define all entities that are used to provide the functionality of the service 120 being requested or modified by way of the service request 124. The orchestration platform 110 can be configured to obtain a recipe 128 for the service 120 being requested or modified, and to analyze the recipe 128 to identify the entities. The orchestration platform 110 can instantiate or trigger instantiation of the service 120 by requesting creation of the entities and/or creating instances of the entities on its own using the recipe 128 as a template. It should be understood that these examples are illustrative, and therefore should not be construed as being limiting in any way.

Once the service 120 is instantiated, the orchestration platform 110 can be configured to update an inventory 130 to reflect the new entities associated with the service 120. In some embodiments, the inventory 130 can be stored by the orchestration platform 110, while in some other embodiments the inventory 130 can correspond to a database that can be in communication with and/or accessible to the orchestration platform 110 and/or one or more modules 112, 114, 116, 118 illustrated and described herein. As such, the illustrated embodiment should be understood as being illustrative and should not be construed as being limiting in any way. According to various embodiments, any update to the inventory 130 can be detected by the inventory management module 116. According to some embodiments, updates to the inventory 130 can be completed by the inventory management module 116. Regardless of how the update to the inventory 130 is detected, the inventory management module 116 can be configured to create or trigger creation of an inventory event 132 in response to detecting the update to the inventory 130. The inventory management module 116 can generate the inventory event 132, in some embodiments, and the event management module 112 can send (e.g., as a broker of the inventory management module 116) the inventory event 132 to the security management platform 102 to inform the security management platform 102 that the entities associated with the service 120 have been created, modified, etc.

According to various embodiments of the concepts and technologies disclosed herein, the inventory events 132 created or published by the inventory management module 116 (and/or in association with the event management module 112) or other functionality associated with the orchestration platform 110 can include and/or can reference one or more security tags (hereinafter collectively and/or generically referred to as "tags") 134. As will be explained in more detail below, the security management platform 102 can use the tags 134 to create a security policy 136. The security management platform 102 can provide the security policy 136 to a computing environment 138 that can host the service 120 (or a component thereof). The computing environment 138 can be configured to implement the security policy 136. In some embodiments, for example, the computing environment 138 can host devices, functions, modules, or other functionality that collectively can correspond to the security scheme 122 mentioned above. Thus, for example, the security scheme 122 can be implemented as a firewall, a deep packet inspection function, authentication functionality, other security measures, combinations thereof, or the like. More details of the creation of the security policy 136 and details about how the security scheme 122 can be implemented at a computing environment 138 that hosts the service 120 (or a component thereof) will be explained below.

The tags 134 can be stored at the design and modeling module 118 and/or at a data storage device, data store, server, or other data storage location that can be accessed by the design and modeling module 118. The tags 134 can be created by an author such as an application or service developer, a programmer, a network operator, a user, or other entity. It can be appreciated that the entities that author the tags 134 may be intimately familiar with computing platforms and cloud architecture, but may not be familiar with security that is appropriate for a service or application authored by the entity. Thus, the tags 134 can describe the service or application, or components thereof, but do not identify security policies for the service or application.

More particularly, the tags 134 can include text strings that can identify links, traffic, or other communications in a networked environment. An example of the tags 134 according to one example embodiment is provided below in TABLE 1. It should be understood that this example is illustrative, and therefore should not be construed as being limiting in any way.

TABLE 1

| Tag ID | ... | Link |
|---|---|---|
| ... | ... | ... |
| X | ... | Communicates with an external database (virtual) |
| Y | ... | Communicates with an external database (physical) |
| Z | ... | Receives service calls from external requestor |
| ... | ... | ... |

It can be appreciated from the example shown in TABLE 1 that the tags 134 can describe links. Thus, an author of a recipe 128 or other entity that creates the tags 134 can determine what type of links are used by the entity being represented by the recipe 128. When the various links for that entity are determined, the author or other entity can create a list of tags 134 for that entity and include that information in the recipe 128. Thus, a recipe 128 can include attributes in the form of tags 134 that can describe links and/or communications associated with the entity. It should be understood that this example is illustrative, and therefore should not be construed as being limiting in any way.

Thus, in some embodiments of the concepts and technologies disclosed herein, the tags 134 described herein can be stored as attributes for entities that are included in the recipes 128. Thus, for example, if a recipe 128 for a service 120 includes an entity such as a firewall function, the tags 134 can correspond to text strings that describe links between the firewall function and other devices or entities; traffic that may be received by the firewall function; traffic that may leave the firewall function; and/or various aspects of how data comes into, through, and out of the firewall function. The tags 134 also can include an identifier for the tag 134 that can be used for various purposes as described in more detail below. According to various embodiments, the tags 134 do not include any specification of and/or definition of security policies, security rules, references to security rules, or the like for an associated entity. Thus, according to embodiments of the concepts and technologies disclosed herein, the tags 134 cannot be used to generate a security policy 136 without other information, as will be explained in more detail below.

The design and modeling module 118 can be configured to provide the tags 134 to the orchestration platform 110 with a recipe 128. In particular, when the orchestration platform 110 requests a recipe 128 (e.g., in response to receiving the service request 124), the design and modeling module 118 can be configured to determine the recipe 128 for a service 120 or component thereof being requested by way of the service request 124; to analyze the identified recipe 128 to determine the entities that will be created in association with the service 120 and/or components thereof; and to identify tags 134 associated with the entities determined. Thus, the tags 134 provided to the orchestration platform 110 with the recipe 128 can correspond to all of the tags 134 for all of the entities being created for the service 120 or component thereof in response to the service request 124. It should be understood that this example is illustrative, and therefore should not be construed as being limiting in any way.

The design and modeling module 118 also can be configured to provide the tags 134 to the orchestration platform 110 when a tag 134 is updated. In particular, an entity such as an author, programmer, cloud operator, network operator, or the like can update a tag 134 by way of a tag update 146. The tag 134 can be edited via a web interface, replaced with an updated version, deleted, or the like. Similarly, new tags 134 can be submitted to the design and modeling module 118. In response to detecting updating of the tags 134, the design and modeling module 118 can provide the updated tag(s) 134 to the orchestration platform 110. The orchestration platform 110 can update an inventory 130 (e.g., by using the inventory management module 116). The inventory management module 116 can be configured to generate a tag event 148 when the tags 134 are updated. As discussed above with reference to the inventory events 132, the tag events 148 can be provided to the security management platform 102.

The security management platform 102 can be configured to generate, modify, terminate, or make other changes to the security policy 136 at various times. In some embodiments, for example, the security management platform 102 can be configured to generate, modify, or make changes to a security policy 136 in response to receiving or otherwise detecting an inventory event 132 (which as explained above can include the tags 134); in response to detecting receiving or otherwise detecting the tag event 148; and/or in response to detecting an update to one or more security policy rules ("policy rules") 140.

The policy rules 140 can be stored at a policy management module 142 that can be in communication with the security management platform 102 directly or via the network 104. The policy rules 140 can include data that defines security rules and/or security policies. The policy rules 140 can be authored by security personnel or other entities. It can be appreciated that the authors of the policy rules 140 can be intimately familiar with security policies and rules, but may not be familiar with the architecture of networks, cloud platforms, or the like. The policy rules 140 can be stored with defined rules or policies, an identifier, data that identifies a tag 134, other data, combinations thereof, or the like. An example of some policy rules 140 is reproduced below in TABLE 2.

TABLE 2

| Key ID | ... | Tag ID | Security Rule ID |
|---|---|---|---|
| ... | ... | ... | ... |
| 92353 | ... | X | A |
| 92354 | ... | X | B |

TABLE 2-continued

| Key ID | ... | Tag ID | Security Rule ID |
|---|---|---|---|
| 92355 | ... | Y | C |
| 92356 | ... | Z | D |
| ... | ... | ... | ... |

As can be appreciated from the above example embodiment of the policy rules 140, a particular tag 134 (as identified by the Tag ID) can be associated with zero, one, or more than one security rule (as identified by the Security Rule ID). In some embodiments, the Tag ID included in the policy rules 140 can correspond to, relate to, or be the same as an associated Tag ID included in the tags 134, though this is not necessarily the case. An example of a tag 134 relating to multiple policy rules 140 could include a tag 134 that is provided to the security management platform 102 including a tag ID "X." The security management platform 102 can determine, via querying (or triggering other entities to query) the policy rules 140 to identify all policy rules 140 that relate to the tag ID "X." In the embodiment shown in TABLE 2, the security management platform 102 could identify the policy rules 140 identified in TABLE 2 as corresponding to the security rule IDs "A" and "B." Thus, the security management platform 102 can determine, for an entity that includes a tag 134 with a tag ID "X," that policy rules 140 having security rule IDs "A" and "B" should apply to that entity. It should be understood that this example is illustrative, and therefore should not be construed as being limiting in any way.

It also can be appreciated with reference to TABLE 2 that a particular policy rule 140 can apply to zero, one, or more than one tag 134. Thus, for example, multiple tags 134 can reference the same policy rule 140. An example of this can be seen in TABLE 2 with reference to tag IDs labeled "X" and "Z." It should be understood that this example is illustrative, and therefore should not be construed as being limiting in any way.

The policy rules 140 also can be updated at any time. As noted above, the updates can include updates from within the computing environment 138, as well as updates from external third parties and/or third party intelligence sources. For example, an entity such as security personnel or other entity may determine that an existing policy rule 140 will be updated or terminated. The policy rules 140 can be updated and the updating of the policy rules 140 can be reported to the security management platform 102. In some embodiments, the policy management module 142 can generate an event such as a policy rule update event 150. The policy rule update event 150 can be provided to the security management platform 102. Because updates to the policy rules 140 can be communicated to the security management platform 102 in additional and/or alternative manners, it should be understood that this example is illustrative, and therefore should not be construed as being limiting in any way.

The security management platform 102 can be configured to determine, in response to detecting an update to the policy rules 140 (e.g., by receiving a policy rule update event 150), whether the security policy 136 should be updated or otherwise changed. If so, the security management platform 102 can generate a new security policy 136 and provide the updated security policy 136 to the computing environment 138. Thus, it can be appreciated that the security management platform 102 can create and/or update the security policy 136 in response to detecting creation of a service 120 or instantiation of an entity or component thereof; in response to detecting an update to a tag 134 (e.g., by receiving a tag event 148); in response to detecting an update to a policy rule 140 (e.g., by receiving a policy rule update event 150); at other times; or the like. The creation of the security policy 136 by the security management platform 102 (and/or the security management module 108 that can be executed by the security management platform 102) will now be described in additional detail.

As mentioned above, the security management platform 102 can receive an inventory event 132 from the orchestration platform 110 (or an inventory management module 116 and/or event management module 112 associated with or in communication with the orchestration platform 110). The inventory event 132 can indicate that the service 120, or one or more entities associated with the service 120, has been deployed, instantiated, or activated at the computing environment 138. The inventory event 132 can include and/or can be provided with one or more tags 134. The tags 134 that are provided with or as a part of the inventory event 132 can be provided as a tag set that includes tags 134 for each entity associated with the service 120 and/or components thereof. Thus, for example, if the service 120 includes an entity set {A, B, C, and D}, the tags 134 included with (or as a part) of the inventory event 132 can include tags 134 for the entity A, tags 134 for the entity B, tags 134 for the entity C, and tags 134 for the entity D, due to a parent-child relationship or other relationship, for example.

In some other embodiments, the inventory event 132 may omit the tags 134. In such embodiments, the security management platform 102 can identify a service (e.g., the service 120) that is associated with the inventory event 132. The security management platform 102 can query (or otherwise access) the recipes 128 to identify entities associated with the service 120. The security management platform 102 also can query or otherwise access the tags 134 to determine the tags associated with the entities associated with the service 120. Thus, it can be appreciated that the security management platform 102 can receive a tag set with the inventory event 132 and/or that the security management platform 102 can build the tag set based on the inventory event 132. It should be understood that these examples are illustrative, and therefore should not be construed as being limiting in any way.

The security management platform 102 can analyze the tags 134 received with the inventory event 132 (or determined based on the inventory event 132) and remove conflicts and/or duplicates. The security management platform 102 also can be configured to supplement the tags 134 with a default tag set, if desired. Thus, the security management platform 102 can be configured to not only apply the tags 134 identified by the developer, author, or other entity that created the recipe 128, but also to add other tags 134 if desired and/or if appropriate. Additionally, the tags 134 can include hierarchies, and as such, a child entity may inherit, from its parent, tags 134 associated with the parent. Thus, the security management platform 102 can also examine hierarchies in the tags 134 and/or among the entities created to identify relevant tags 134 based on inherencies or other relationships, and to add these tags 134. Based on the original received or identified tags 134, the default tags 134 (if any), and the tags 134 added by way of inheritance from related entities, the security management platform 102 can generate a final tag set. Thus the final tag set can represent all of the tags 134 after conflicts and/or duplicates in the tags 134 are resolved and/or removed; after any default tags 134 are added; after all related tags 134 are added; and/or after any other operations are performed to create the final tag set.

The security management platform 102 can create, based on the final tag set, a list of tags 134 that are included in the final tag set. In some embodiments, the list of tags 134 can include a list of tag identifiers (e.g., the Tag IDs illustrated and described above). The security management platform 102 can access the policy rules 140 (e.g., by querying the policy management module 142) to determine the policy rules 140 that correspond to the tags 134 (or Tag IDs, identifiers, keys, or the like) included in the final tag set. The security management platform 102 can receive or obtain the policy rules 140 from the policy management module 142.

The security management platform 102 can compute, based on the obtained policy rules 140, the security policy 136 for the service 120 or a component thereof. Thus, the security management platform 102 can generate a policy for a particular entity based on the tags 134, namely by accessing the policy rules 140 and generating the security policy 136 based on the policy rules 140. It can be appreciated that the ability to separate the specification of links and/or other architectural specifics of an entity from the creation of a security policy for that entity can enable respective experts in architecture and security to focus only on architecture and security, respectively. This can improve the security of the service 120 and/or its components.

Furthermore, it can be appreciated that some embodiments of the concepts and technologies disclosed herein for creating a security policy 136 can be more efficient than existing technologies that rely on programmers or service creators to create associated security policies. Such existing technologies provide poor security for services because the authors or creators of the services often lack an understanding of security. Similarly, security entities associated with a network provider often lack knowledge of service architecture. The ability to represent links and/or communications associated with a service 120 as tags 134, and to use those tags 134 to identify policy rules 140; as well as the ability to update at any time the tags 134 associated with an entity as well as the policy rules 140; enables a current security policy 136 to be created at any time.

Thus, embodiments of the concepts and technologies disclosed herein provide for creation of security policies 136 based on tags 134 that represent links and/or communications for an entity included in a service (e.g., the service 120), where the tags 134 are created and/or updated without concern for security; and the based on policy rules 140 that are created and/or updated by security personnel or other entities without concern for architecture associated with a particular service 120. Thus, embodiments of the concepts and technologies disclosed herein can result in efficient creation of security policies 136 based on policy rules 140 and tags 134, each of which can be continually updated to reflect the current best practices. It should be understood that this example is illustrative, and therefore should not be construed as being limiting in any way.

Once the security policy 136 has been created, the security management platform 102 can provide the security policy 136 to the computing environment 138 and/or another entity associated with the computing environment 138 (e.g., the orchestration platform 110, a controller (not shown in FIG. 1), or other entity). The recipient of the security policy 136 can be configured to implement the security policy 136 as represented by the security scheme 122 illustrated in FIG. 1. The security scheme 122 can include hardware and/or software that can implement the security policy 136 as created by the security management platform 102. Thus, the security scheme 122 can represent one or more physical and/or virtual devices, appliances, functions, or the like for actualizing the security policy 136. It should be understood that this example is illustrative, and therefore should not be construed as being limiting in any way.

In practice, an orchestration platform 110 can receive, from a requestor 126, a service request 124. The service request 124 can request creation of a service 120, deployment of an instance of an existing service 120, activation of a service 120, scaling of a service 120, combinations thereof, or the like. The orchestration platform 110 can access the recipes 128, for example at the design and modeling module 118, and identify a recipe 128 associated with the service 120 that relates to the service request 124. The recipe 128 can specify one or more entities that are used to provide the service 120. The recipe 128 also can include and/or can reference tags 134 associated with each entity identified in the recipe 128. The orchestration platform 110 can use the recipe 128 to create the service 120. The orchestration platform 110 can also update the inventory 130 to reflect the new service 120 (and/or components thereof) and can generate (e.g., via the inventory management module 116), an inventory event 132 that can be provided to the security management platform 102.

The security management platform 102 can receive the inventory event 132. As explained above, the inventory event 132 can include tags 134 associated with each entity that is reflected by the inventory event 132. In some embodiments, the tags 134 may not be provided with the inventory event 132. Rather, the security management platform 102 can receive the inventory event 132, identify a service (e.g., the service 120) that relates to the inventory event 132, access the recipes 128 (directly or indirectly) to identify entities associated with the service, and identify, based on the identities of the entities, the tags 134. Regardless of how the tags 134 are obtained by the security management platform 102, the security management platform 102 can modify the tags 134 by supplementing the tags 134 with default tags (if any), by removing duplicates among the tags 134 and/or by resolving conflicts among the tags 134, by identifying tags 134 via relationships among the tags 134 and/or the entities, combinations thereof, or the like. Thus, the security management platform 102 can generate a final tag set.

The security management platform 102 can analyze the tags 134 in the final tag set and access one or more policy rules 140 that relate to the tags 134 in the final tag set. The security management platform 102 can access a policy management module 142 to obtain the policy rules 140, e.g., based on tag identifiers, keys, or the like in the final tag set. The security management platform 102 can receive a set of policy rules 140 that relate to the final set of tags 134, and can compute a security policy 136 based on the final set of policy rules 140. The security management platform 102 can provide the security policy 136 to the computing environment 138, and the computing environment 138 can apply the security policy 136 to the service 120.

The security policy 136 can be updated at any time. In particular, the security management platform 102 can be configured to update the security policy 136 in response to detecting a change in a tag 134 (e.g., by receiving a tag update 146); in response to receiving a policy rule update event 150; or the like. It should be understood that the ability to update security policies 136 may be limited by network operators to avoid triggering of alarms, alerts, and/or other adverse effects. The updated security policy 136 can be created in a similar manner and provided to the computing environment 138. It should be understood that this example is illustrative, and therefore should not be construed as being limiting in any way.

FIG. 1 illustrates one security management platform 102, one network 104, one orchestration platform 110, one design and modeling module 118, one requestor 126, one computing environment 138, and one policy management module 142. It should be understood, however, that various implementations of the operating environment 100 can include zero, one, or more than one security management platform 102; zero, one, or more than one network 104; zero, one, or more than one orchestration platform 110; zero, one, or more than one design and modeling module 118; zero, one, or more than one requestor 126; zero, one, or more than one computing environment 138; and/or zero, one, or more than one policy management module 142. As such, the illustrated embodiment should be understood as being illustrative, and should not be construed as being limiting in any way.

Figure 2:
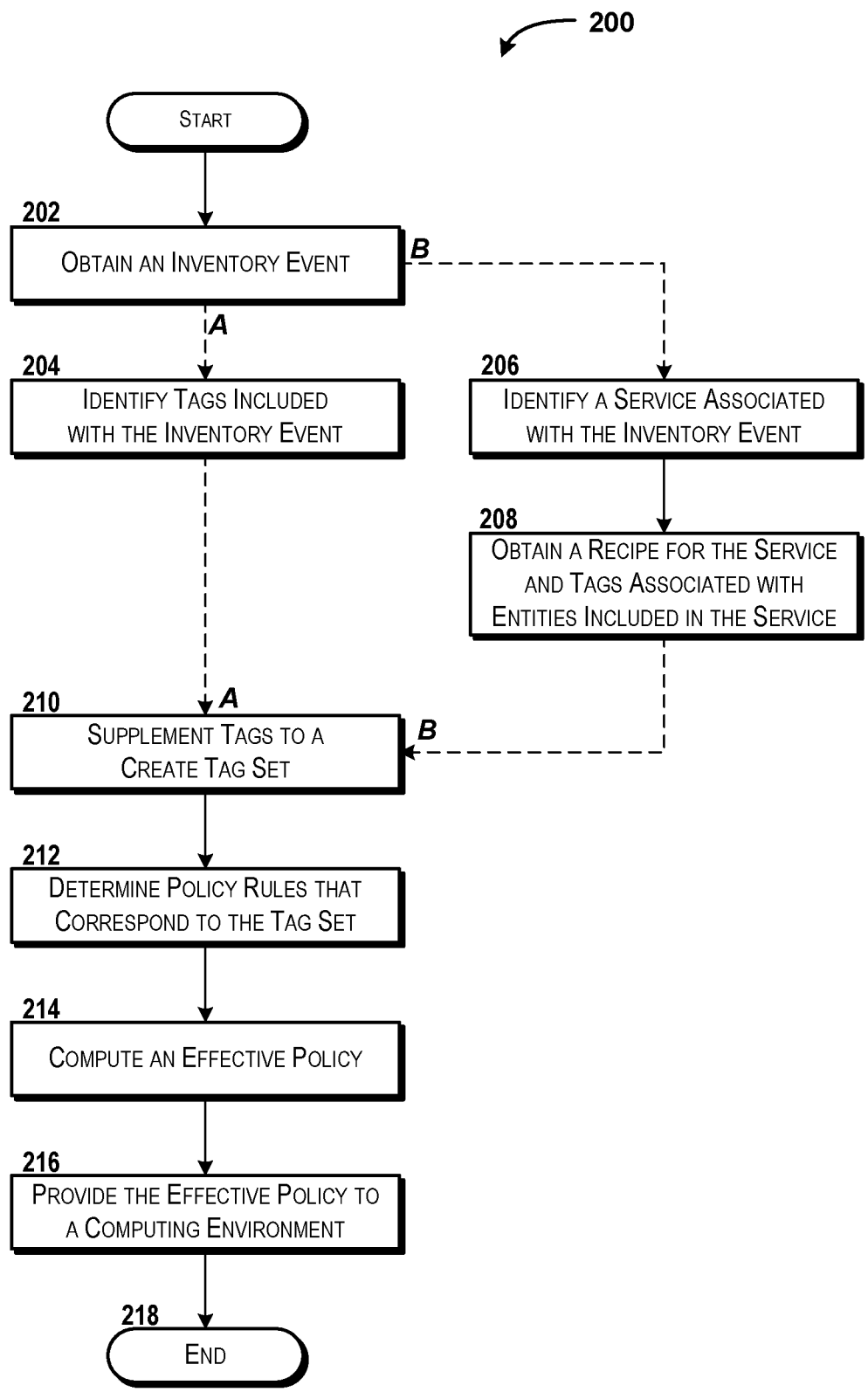
FIG. 2 is a flow diagram showing aspects of a method for creating a security policy using tags, according to an illustrative embodiment of the concepts and technologies described herein.

Turning now to FIG. 2, aspects of a method 200 for creating a security policy using tags will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the security management platform 102, the orchestration platform 110, the computing environment 138, or other devices illustrated and described herein, to perform one or more operations and/or causing the processor to direct other components of the computing system or device to perform one or more of the operations.

For purposes of illustrating and describing the concepts of the present disclosure, the methods disclosed herein are described as being performed by the security management platform 102 via execution of one or more software modules such as, for example, the security management module 108. It should be understood that additional and/or alternative devices and/or network nodes can provide the functionality described herein via execution of one or more modules, applications, and/or other software including, but not limited to, the security management module 108. Thus, the illustrated embodiments are illustrative, and should not be viewed as being limiting in any way.

The method 200 begins at operation 202. At operation 202, the security management platform 102 can receive an inventory event such as the inventory event 132 illustrated and described above with reference to FIG. 1. As explained above with reference to FIG. 1, the inventory event 132 can be received or otherwise obtained from an orchestration platform 110, a component thereof, and/or an entity in communication therewith. According to various embodiments, the inventory event 132 illustrated and described herein can be received from an inventory management module 116 and/or the event management module 112 (e.g., the inventory management module 116 can generate or publish the inventory event 132, and the event management module 112 can send the inventory event 132 to the security management platform 102). According to various embodiments, the inventory management module 116 can generate the inventory event 132 in association with updating the inventory 130. The inventory management module 116 can be configured to update to the inventory 130 (and the associated generation of the inventory event 132) when a new service or service component (e.g., the service 120) is instantiated, for example in response to a service request 124 from a requestor 126, or the like. Because the inventory event 132 can be generated in additional and/or alternative times, it should be understood that these examples are illustrative, and therefore should not be construed as being limiting in any way.

Thus, it can be appreciated that in some embodiments, the inventory management module 116 can be configured to identify a recipe 128 for a service or service component (e.g., the service 120) that is responsive to a service request 124 or other command or request for instantiated the service or service component such as the service 120. The recipe 128 can specify one or more entities that are to be instantiated to create the service 120 requested (or ordered). The recipe 128 also can include and/or can reference one or more tags 134. In some embodiments, the tags 134 can correspond to attributes or other descriptive data that can be included in the recipe 128. The tags 134 can describe links and/or communications associated with a service or service component associated with the recipe 128.

As such, it can be appreciated that the inventory event 132 received in operation 202 can include the tags 134, in some embodiments. In some other embodiments the inventory event 132 may not include the tags 134, and the tags 134 instead can be obtained by the security management platform 102 based on the inventory event 132. Thus, the method 200 can proceed to either operations 204 or 206. In particular, if the inventory event 132 received in operation 202 includes the tags 134, the method 200 can proceed to operation 204, as shown by path A in FIG. 2. If the inventory event 132 received in operation 202 does not include the tags 134, the method 200 can proceed to operation 206, as shown by path B in FIG. 2. The embodiment shown by path A will be illustrated and described first.

At operation 204, the security management platform 102 can identify the tags 134 included with in the inventory event 132. As explained above, the tags 134 can be formatted in various manners. As such, "identifying" the tags 134 can include recognizing received data as corresponding to the tags 134, parsing the inventory event 132 to identify the tags 134; or the like. In some embodiments, wherein the tags 134 are stored as attributes or other types of metadata, the functionality of operation 204 can include parsing the inventory event 132 to identify the attributes as the tags 134. In another embodiment, the tags 134 can be sent to the security management platform 102 as a stand-alone data file, and as such, the functionality of operation 204 can correspond to the security management platform 102 receiving the tags 134 as a data file. Because the tags 134 can be identified in additional and/or alternative manners, it should be understood that the above examples are illustrative, and therefore should not be construed as being limiting in any way.

If the tags 134 are not provided with the inventory event 132, the method 200 can proceed to operation 206 along path B as shown in FIG. 2. At operation 206, the security management platform 102 can identify a service associated with the inventory event 132 received or otherwise obtained in operation 202. In some embodiments, for example, the inventory event 132 can specify a service (e.g., the service 120) that has been instantiated and/or that has prompted the update to the inventory 130 (and triggering delivery of the inventory event 132. Thus, for example, if the service 120 corresponds to an instance of a particular application or module, the inventory event 132 can identify the application or module. Because the service associated with the inventory event 132 can be identified in additional and/or alternative manners, it should be understood that this example is illustrative, and therefore should not be construed as being limiting in any way.

From operation 206, the method 200 can proceed to operation 208. At operation 208, the security management platform 102 can obtain a recipe 128 for the service (e.g., the service 120) identified in operation 206 and can obtain tags 134 associated with entities included in the service 120. In particular, the security management platform 102 can access the design and modeling module 118 (directly or indirectly) and obtain or access a recipe 128 associated with the service 120. The security management platform 102 can identify entities included in the recipe 128 and determine tags 134 for each of the entities included in the recipe 128. In some embodiments, as noted above, the recipe 128 may include the tags 134, and as such, the functionality described herein with reference to operation 208 for identifying entities may be not be required and/or may not be performed by the security management platform 102. Thus, in operation 208, the security management platform 102 can directly or indirectly obtain the tags 134 based on the service identified in operation 206.

From operation 208, the method 200 can proceed along the path B to operation 210. The method 200 also can proceed to operation 210 along path A, namely from operation 204. At operation 210, the security management platform 102 can supplement the tags 134 obtained in operation 204 or in operation 208. In particular, the security management platform 102 can be configured, in some embodiments, to add default tags 134 to the tags 134 obtained in operation 204 or in operation 208. Thus, for example, an entity may specify default security preferences or requirements that the entity wishes to impose on any service or service component (e.g., the service 120), and operation 210 therefore can include those default tags 134 being added to the set of tags 134 obtained by the security management platform 102.

Additionally, or alternatively, the security management platform 102 can be configured to analyze the tags 134 stored at the design and modeling module 118 (or elsewhere) to identify inherencies and/or relationships among the tags 134. The tags 134 can be stored with a hierarchy, in some embodiments. Thus, for example, a particular service 120 may include four components {A, B, C, and D}. The service 120 itself may have specific links that are described by respective tags 134 for the service 120, while each component may also have links described by respective tags 134. In such a case, it can be appreciated that if an inventory event 132 specifies instantiation of a component D, the tags 134 (for the component D) can be supplemented in operation 210 with tags 134 that apply to the service 120. Thus, operation 210 can include adding to the tags 134 based on default rules, configurations, settings; tag relationships and/or hierarchies; other requirements; combinations thereof; or the like. Because the tags 134 can be supplemented in additional and/or alternative manners, it should be understood that this example is illustrative, and therefore should not be construed as being limiting in any way.

In operation 210, the security management platform 102 can create a set of tags 134 that is referred to herein as a "tag set." The tag set can include the tags 134 obtained in operation 204 or operation 208, as supplemented in operation 210. The tag set therefore can collectively describe links and/or communications associated with the service 120 or component thereof as referenced by the inventory event 132.

From operation 210, the method 200 can proceed to operation 212. At operation 212, the security management platform 102 can identify one or more policy rules 140 that correspond to the tag set generated in operation 210. As explained above with reference to FIG. 1, the policy rules 140 can be stored with one or more references to tags 134 such as, for example, tag identifiers ("Tag IDs"), keys (e.g., key IDs, or the like), or other references that can be used to associate a tag 134 with a policy rule 140. Thus, in operation 212, the security management platform 102 can identify each tag 134 in the tag set created in operation 210 and identify, e.g., by querying the policy rules 140 stored at the policy management module 142 (either directly or indirectly) for policy rules 140 that reference the identified tag 134. In some embodiments, the identification of the policy rules 140 can be completed via matching tag IDs or other identifiers. It should be understood that this example is illustrative, and therefore should not be construed as being limiting in any way.

In operation 212, the security management platform 102 can obtain a set of policy rules 140 associated with all of the tags 134 in the tag set. In operation 212, although not separately illustrated in FIG. 2, the security management platform 102 can remove and/or resolve conflicts between policy rules 140 obtained in operation 212; remove duplicate policy rules 140, if any; and thereby obtain a set of policy rules 140 associated with the service 120. It should be understood that this example is illustrative, and therefore should not be construed as being limiting in any way.

From operation 212, the method 200 can proceed to operation 214. At operation 214, the security management platform 102 can compute an effective policy (e.g., the security policy 136) based on the policy rules 140 obtained in operation 212. According to various embodiments, the security management platform 102 can apply the policy rules 140 identified in operation 212 to the links identified by the tags 134 in the tag set. Thus, operation 214 can include the security management platform 102 referencing the policy rules 140 and the tag set to determine how links and/or communications associated with the service 120 are to be governed by the security policy 136. It should be understood that this example is illustrative, and therefore should not be construed as being limiting in any way.

From operation 214, the method 200 can proceed to operation 216. At operation 216, the security management platform 102 can provide the effective policy determined in operation 214 (e.g., the security policy 136) to a computing environment (e.g., the computing environment 138 that hosts the service 120) or an entity associated therewith (e.g., a controller, or the like) for implementation. As such, operation 216 can correspond to the rollout and/or activation of the security policy 136 determined in accordance with various embodiments of the concepts and technologies disclosed herein.

From operation 216, the method 200 can proceed to operation 218. The method 200 can end at operation 218.

Figure 3:
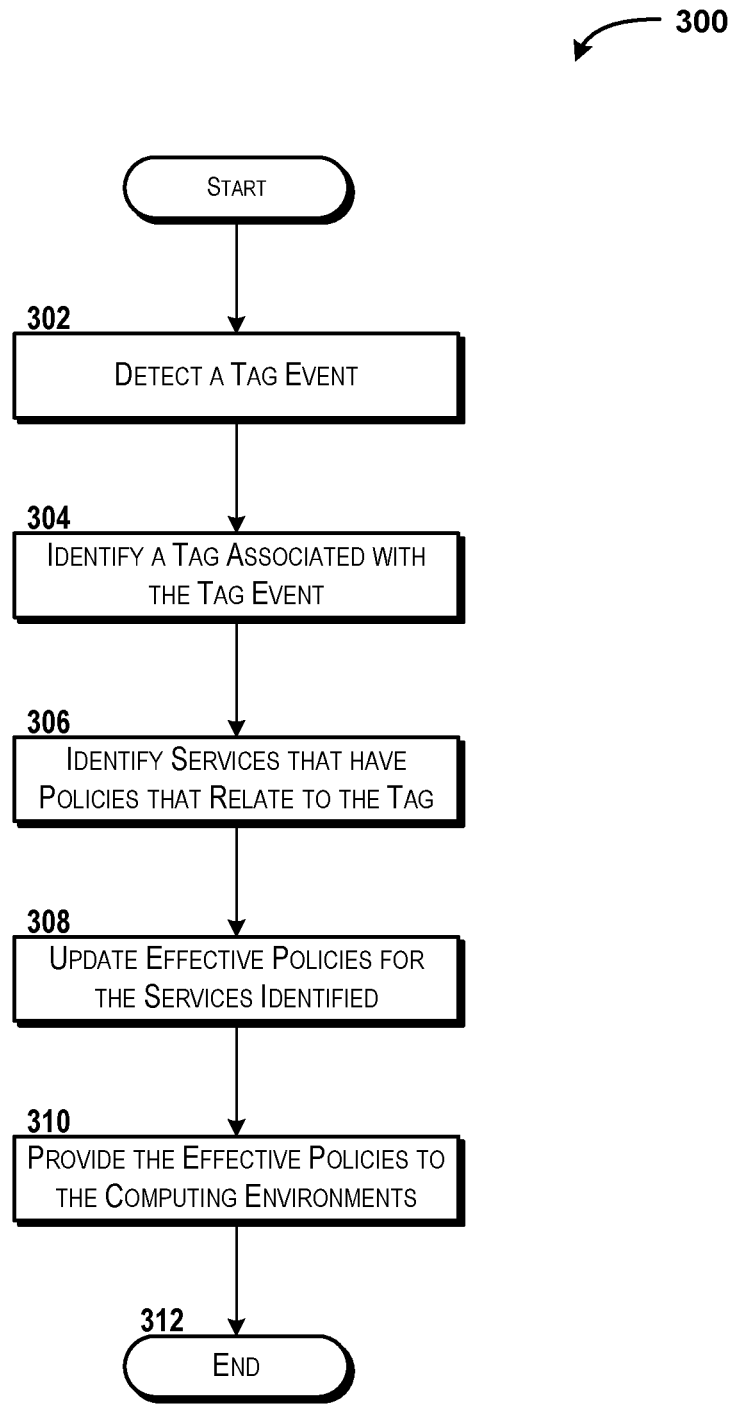
FIG. 3 is a flow diagram showing aspects of a method for updating a security policy, according to one illustrative embodiment of the concepts and technologies described herein.

Turning now to FIG. 3, aspects of a method 300 for updating a security policy 136 in response to a tag event 148 will be described in detail, according to an illustrative embodiment. The method 300 begins at operation 302. At operation 302, the security management platform 102 can detect a tag event 148. In some embodiments, the security management platform 102 can detect the tag event 148 by receiving or otherwise obtaining the tag event 148. In some embodiments, for example, the inventory management module 116 can be configured to send, to the security management platform 102, a tag event 148 when a tag 134 is updated at the design and modeling module 118 (or elsewhere), for example by way of a tag update 146, or the like. As explained with reference to FIG. 1, the tags 134 can be updated at any time by any authorized entity, and any update to the tags 134 can result in generation of a tag event 148 by the inventory management module 116. It should be understood that this example is illustrative, and therefore should not be construed as being limiting in any way.

In some example embodiments, for example, an update to a tag 134 can occur when a service definition (referred to herein as a "recipe 128") is updated or changed where such an update or change results in an update, addition, or removal of a link or communication associated with the service defined by the recipe 128, e.g., the service 120. In such a case, a tag 134 can be changed or added to reflect the new link or communication, and a tag event 148 can be generated to indicate the change being made to the tags 134. Because a tag event 148 can be created in response to additional and/or alternative changes to the tags 134, it should be understood that this example is illustrative, and therefore should not be construed as being limiting in any way.

From operation 302, the method 300 can proceed to operation 304. At operation 304, the security management platform 102 can identify a tag 134 associated with the tag event 148 detected in operation 302. Thus, in operation 304, the security management platform 102 can analyze the tag event 148 received in operation 302 and determine, based on the analysis, the tag 134 that has been created or updated. In some embodiments, the tag event 148 can identify the tag 134 explicitly, and in some other embodiments the tag event 148 can include a tag ID, a key, or other identifier that can be used by the security management platform 102 to identify the tag 134. Thus, in operation 304 the security management platform 102 can perform analysis of the tag event 148 to identify the affected tag 134; parse data from the tag event 148 to identify the affected tag 134; and/or otherwise identify the tag 134.

From operation 304, the method 300 can proceed to operation 306. At operation 306, the security management platform 102 can identify one or more services 120 that have security policies 136 that relate to the tag 134. In some embodiments, the security management platform 102 can access the recipes 128 and/or the tags 134, which can be stored at or in communication with the design and modeling module 118. The security management platform 102 can access the recipes 128 and the tags 134 directly or indirectly. In some embodiments, the security management platform 102 can query the recipes 128 and/or the tags 134 to identify service definitions (e.g., the recipes 128) that reference the tag identified in operation 304. In some other embodiments, the security management platform 102 can identify services 120 that have security policies 136 that were generated based on the affected tag 134. Because the security management platform 102 can identify the services 120 that have security policies 136 based on the affected tag 134 in a number of manners, it should be understood that the above examples are illustrative and should not be construed as being limiting in any way.

From operation 306, the method 300 can proceed to operation 308. At operation 308, the security management platform 102 can update effective policies (e.g., the security policies 136) for the services 120 identified in operation 306. In some embodiments, the security management platform 102 can update an existing security policy 136 in operation 308, while in some other embodiments the security management platform 102 can re-generate the security policy 136 in operation 308. If the security policy 136 is re-generated, it should be understood that the re-generation of the security policy 136 in operation 308 can be, but is not necessarily, similar or even identical to the generation of the security policy 136 as illustrated and described with reference to operations 204 through 216 (along either of paths A or B) of the method 200 described above with reference to FIG. 2. It also should be understood that versions of the security policy 136 can be stored to enable versioning, and as such, the concepts and technologies disclosed herein can be used to enable rollbacks and/or reversion to prior versions of the security policy 136, though this is not necessarily the case.

From operation 308, the method 300 can proceed to operation 310. At operation 308, the security management platform 102 can provide the updated or new effective policies (e.g., the security policies 136) to the computing environments 138 that host the affected services 120 or service components. The computing environments 138 can be configured to use the new security policies 136, to replace previously used versions of the security policies 136, or to otherwise update the security schemes 122 associated with the services 120.

From operation 310, the method 300 can proceed to operation 312. The method 300 can end at operation 312.

Figure 4:
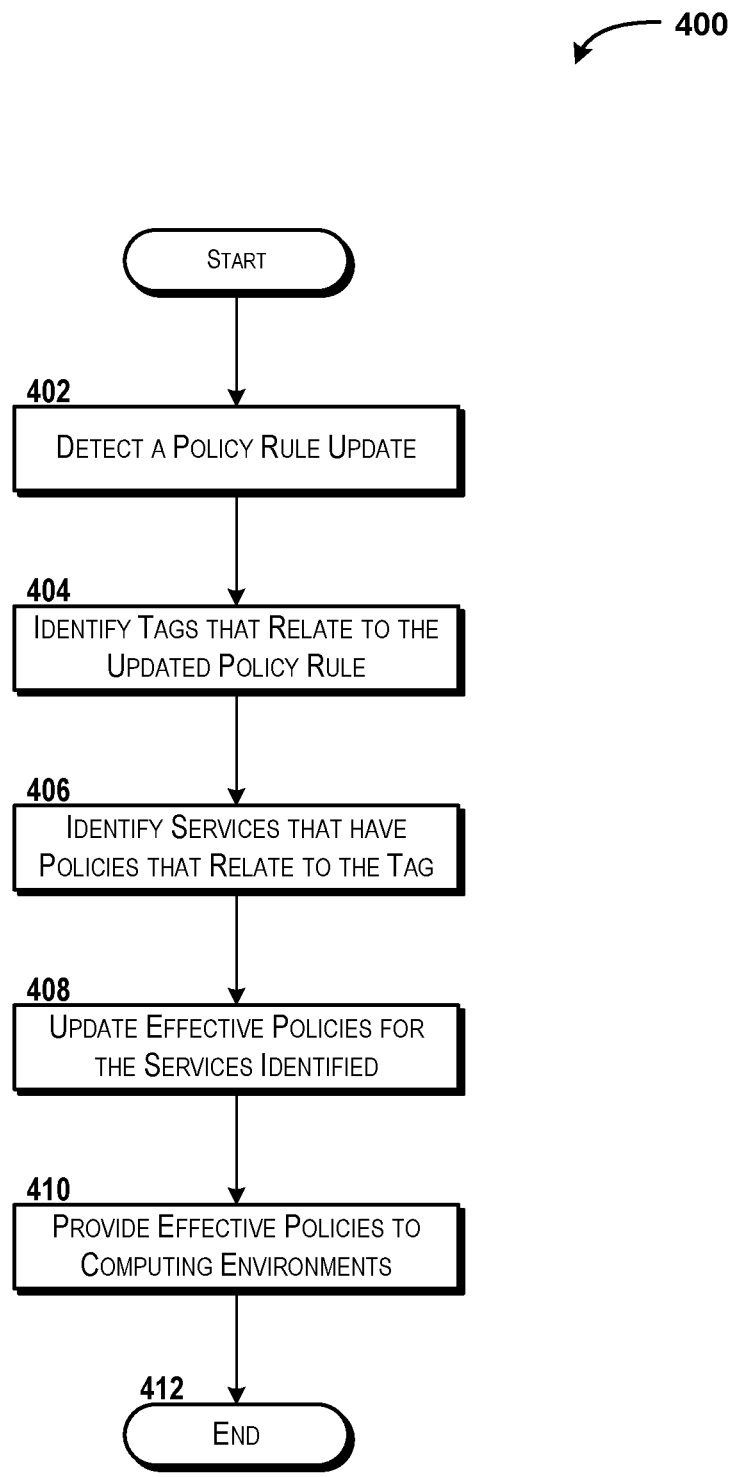
FIG. 4 is a flow diagram showing aspects of a method for updating a security policy, according to another illustrative embodiment of the concepts and technologies described herein.

Turning now to FIG. 4, aspects of a method 400 for updating a security policy will be described in detail, according to another illustrative embodiment. The method 400 begins at operation 402. At operation 402, the security management platform 102 can detect a policy rule update event 150. In some embodiments, the security management platform 102 can detect the policy rule update event 150 by receiving or otherwise obtaining the policy rule update event 150. In some embodiments, for example, the policy management module 142 can be configured to send, to the security management platform 102, a policy rule update event 150 when a policy rule 140 is updated at the policy management module 142 (e.g., by way of a policy update 144, or the like). As explained with reference to FIG. 1, the policy rules 140 can be updated at any time by any authorized entity. According to various embodiments of the concepts and technologies disclosed herein, any update to the policy rules 140 can result in generation of a policy rule update event 150 by the policy management module 142. It should be understood that this example is illustrative, and therefore should not be construed as being limiting in any way.

In some example embodiments, for example, an update to a policy rule 140 can occur when a security policy is updated or changed by security personnel or other entities. The updates can include updates from third parties and/or third party intelligence sources as well. Such updates can occur at almost any time. In one contemplated embodiment, a security personnel may determine that a particular link or communication is subject to a new form of attack or exploitation, and may create a new policy rule 140, update an existing policy rule 140, and/or make other changes to the policy rules 140 to reflect the new risk (e.g., the new attack or exploitation). Because a policy rule update event 150 can be created in response to additional and/or alternative changes to the policy rules 140, it should be understood that this example is illustrative, and therefore should not be construed as being limiting in any way.

From operation 402, the method 400 can proceed to operation 404. At operation 404, the security management platform 102 can identify a one or more tags 134 (e.g., tags 134 stored at the design and modeling module 118) that relate to the updated policy rule 140. Thus, in operation 404, the security management platform 102 can access the policy rules 140 and/or query the policy rules 140 to identify tag IDs (or other identifiers) that are associated with the affected policy rule 140 and determine, based on the identified tag IDs or other identifiers what tags 134 relate to the updated policy rule 140. Thus, the security management platform 102 can identify, in operation 404, tags 134 that relate to the new or modified policy rule 140. Because the security management platform 102 can do this in a number of ways, it should be understood that the above example is illustrative and should not be construed as being limiting in any way.

From operation 404, the method 400 can proceed to operation 406. At operation 406, the security management platform 102 can identify one or more services 120 that have security policies 136 that relate to the tags 134 identified in operation 404. Thus, it can be appreciated that in operation 406 the security management platform 102 can identify services 120 that have security policies 136 that relate to the policy rule 140 updated or added as indicated by the policy rule update event 150 detected in operation 402. It should be understood that the operation 406 can be, but is not necessarily, similar to the operation 306 described above with regard to FIG. 3. Thus, it can be appreciated that in operation 406, the security management platform 102 can access the recipes 128 and/or the tags 134 directly or indirectly and/or can query the recipes 128 and/or the tags 134 to identify service definitions (e.g., the recipes 128) that reference the tags 134 identified in operation 404. In some other embodiments, the security management platform 102 can identify services 120 that have security policies 136 that were generated based on the affected tag 134. Because the security management platform 102 can identify the services 120 that have security policies 136 based on the affected tag 134 (and by extension the affected policy rule 140) in a number of manners, it should be understood that the above examples are illustrative and should not be construed as being limiting in any way.

From operation 406, the method 400 can proceed to operation 408. At operation 408, the security management platform 102 can update effective policies (e.g., the security policies 136) for the services 120 identified in operation 406. It should be understood that the operation 408 can be, but is not necessarily, similar or even identical to the operation 308 described above with regard to FIG. 3. Thus, the security management platform 102 can update an existing security policy 136 in operation 408 and/or can re-generate the security policy 136 in operation 408. If the security policy 136 is re-generated, the re-generation of the security policy 136 can be, but is not necessarily, similar or even identical to the generation of the security policy 136 as illustrated and described with reference to operations 204 through 216 (along either of paths A or B) of the method 200 described above with reference to FIG. 2.

From operation 408, the method 400 can proceed to operation 410. At operation 410, the security management platform 102 can provide the updated effective policies (e.g., the security policies 136) to the computing environments 138 that host the affected services 120 or service components. It should be understood that the functionality of the security management platform 102 described herein with reference to operation 410 can be, but is not necessarily, similar or even identical to the functionality of the security management platform 102 illustrated and described above with reference to operation 310 described above with regard to FIG. 3. The computing environments 138 can be configured to use the new security policies 136, to replace previously used versions of the security policies 136, or to otherwise update the security schemes 122 associated with the services 120.

From operation 410, the method 400 can proceed to operation 412. The method 400 can end at operation 412.

Figure 5:
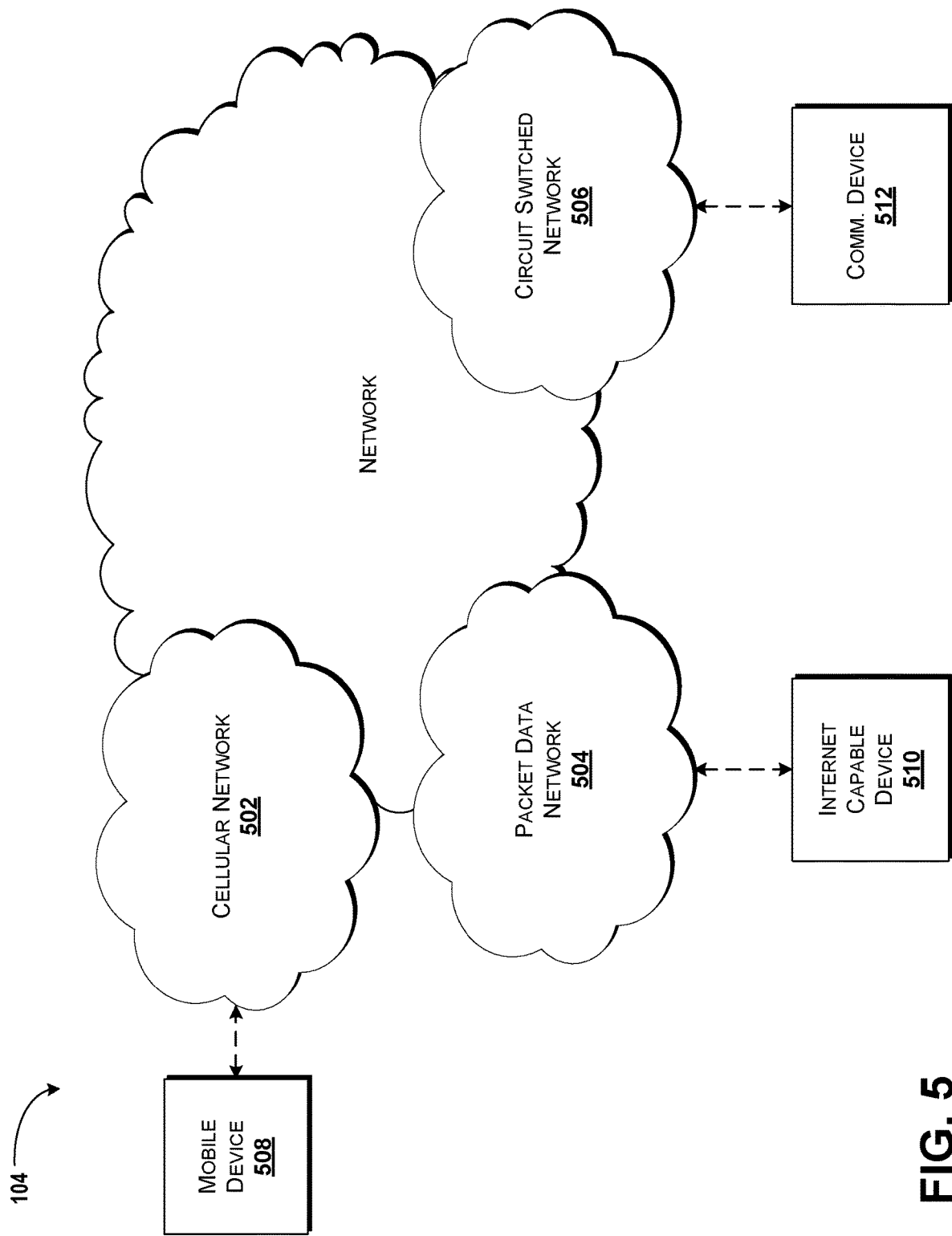
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
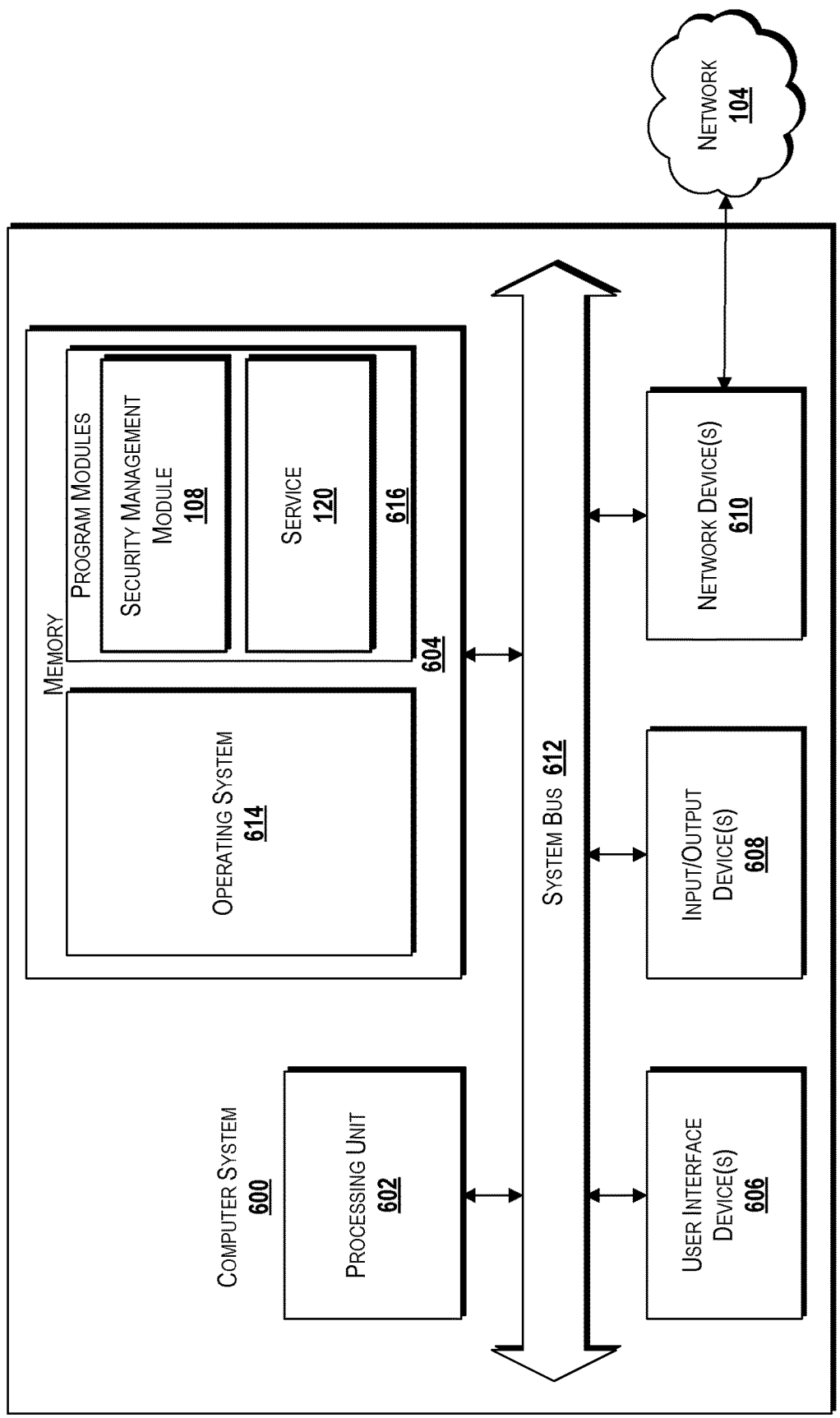
FIG. 6 is a block diagram illustrating an example computer system configured to provide tag-based security policy creation in a distributed computing environment, according to some illustrative embodiments of the concepts and technologies described herein.

FIG. 6 is a block diagram illustrating a computer system 600 configured to provide the functionality described herein for tag-based security policy creation in a distributed computing environment, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the security management module 108, the service 120, and/or other applications, modules, or the like as illustrated and described herein (e.g., the orchestration platform 110, the event management module 112, the data analytics module 114, the inventory management module 116, the design and modeling module 118, the policy management module 142, etc.). These and/or other programs can be embodied in computer-readable media containing instructions that, when executed by the processing unit 602, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the service request 124, the recipes 128, the inventory 130, the inventory events 132, the tags 134, the security policy 136, the policy rules 140, the policy updates 144, the tag updates 146, the tag events 148, the policy rule update events 150, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
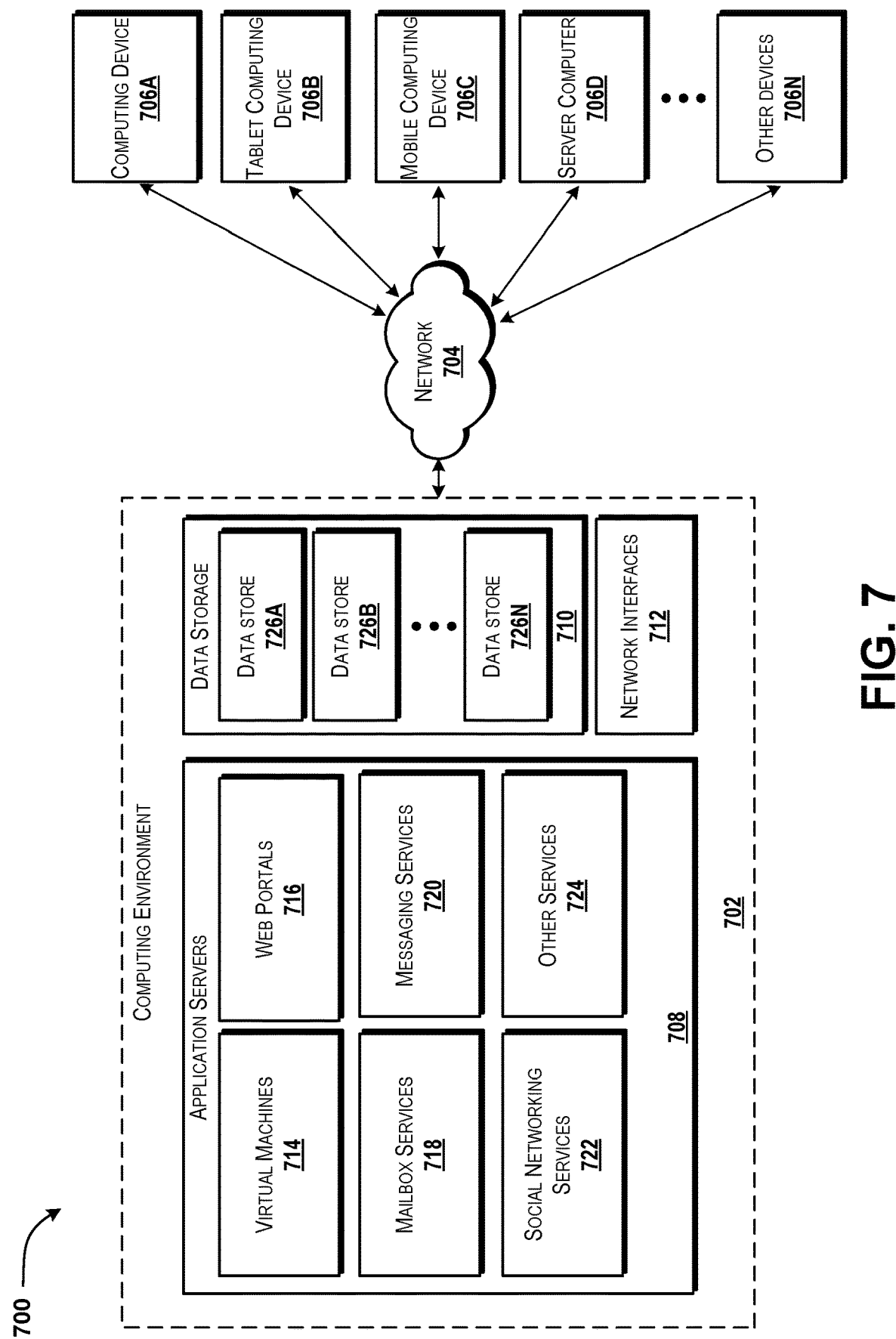
FIG. 7 is a diagram illustrating a computing environment capable of implementing aspects of the concepts and technologies disclosed herein, according to some illustrative embodiments of the concepts and technologies described herein.

FIG. 7 illustrates an illustrative distributed computing environment 700 capable of executing the software components described herein for tag-based security policy creation in a distributed computing environment. Thus, the distributed computing environment 700 illustrated in FIG. 7 can be used to provide the functionality described herein with respect to the security management platform 102, the orchestration platform 110 (and/or components thereof), the design and modeling module 118, the requestor 126, the computing environment 138, and/or the policy management module 142. The distributed computing environment 700 thus may be utilized to execute any aspects of the software components presented herein.

According to various implementations, the distributed computing environment 700 includes a computing environment 702 operating on, in communication with, or as part of the network 704. The network 704 also can include various access networks. According to various embodiments of the concepts and technologies disclosed herein, the functionality of the network 704 can be provided by the network 104 illustrated in FIGS. 1 and 5-6. One or more client devices 706A-706N (hereinafter referred to collectively and/or generically as "clients 706") can communicate with the computing environment 702 via the network 704 and/or other connections (not illustrated in FIG. 7). In the illustrated embodiment, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. A computing architecture for the clients 706 is illustrated and described herein with reference to FIG. 6. It should be understood that the illustrated clients 706 and computing architectures illustrated and described herein are illustrative, and should not be construed as being limited in any way.

In the illustrated embodiment, the computing environment 702 can include one or more application servers 708, one or more instances of data storage 710, and one or more network interfaces 712. According to various implementations, the functionality of the application servers 708 can be provided by one or more server computers that can execute as a part of, or in communication with, the network 704. The application servers 708 can host various services, virtual machines, portals, and/or other resources. In the illustrated embodiment, the application servers 708 can host one or more virtual machines 714 for hosting applications, services, modules, or other functionality. According to various implementations, the virtual machines 714 can host one or more applications and/or software modules for providing the functionality described herein for tag-based security policy creation in a distributed computing environment. It should be understood that this embodiment is illustrative, and should not be construed as being limiting in any way. The application servers 708 also can host or can provide access to one or more Web portals, one or more link pages, one or more Web sites, and/or one or more other sources or access points to various types of information ("Web portals") 716.

According to various implementations, the application servers 708 also can include one or more mailbox services 718 and one or more messaging services 720. The mailbox services 718 can include electronic mail ("email") services. The mailbox services 718 also can include various personal information management ("PIM") services including, but not limited to, calendar services, contact management services, collaboration services, and/or other services. The messaging services 720 can include, but are not limited to, instant messaging services, chat services, forum services, and/or other communication services.

The application servers 708 also can include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 722 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above embodiments are illustrative, and should not be construed as being limited in any way.

As shown in FIG. 7, the application servers 708 also can host other services, applications, portals, and/or other resources ("other resources") 724. The other resources 724 can include, but are not limited to, the security management module 108, the orchestration platform 110, the event management module 112, the data analytics module 114, the inventory management module 116, the service 120, the design and modeling module 118, the policy management module 142, and the like. It thus can be appreciated that the computing environment 702 can provide integration of the concepts and technologies disclosed herein provided herein for tag-based security policy creation in a distributed computing environment with various mailbox, messaging, social networking, and/or other services or resources. For example, the concepts and technologies disclosed herein can be used to generate messages or mail items when updates to the tags 134 and/or the policy rules 140 are detected; when the service 120 is instantiated; when the security policy 136 is created or provided to the computing environment 138; or the like. Because the creation of messages and/or mail items is optional, it should be understood that this example is illustrative, and therefore should not be construed as being limiting in any way.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual data stores 726A-726N (hereinafter referred to collectively and/or generically as "data stores 726"). The data stores 726 are configured to host data used or created by the application servers 708 and/or other data. Although not illustrated in FIG. 7, it should be understood that the data stores 726 also can host or store the various data illustrated and described herein including, but not limited to, the recipes 128, the inventory events 132, the tags 134, the security policy 136, the policy rules 140, the policy updates 144, the tag updates 146, the policy rule update events 150, and/or the like.

The computing environment 702 can communicate with, can communicate via, and/or can be accessed by, the network interfaces 712. The network interfaces 712 can include various types of network hardware and/or software (virtual and/or physical) for supporting communications between two or more computing devices including, but not limited to, the clients 706 and the application servers 708. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to one or more of the clients 706. It should be understood that the clients 706 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 700 to utilize the functionality described herein for tag-based security policy creation in a distributed computing environment.

Based on the foregoing, it should be appreciated that systems and methods for tag-based security policy creation in a distributed computing environment have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and a memory that stores computer-executable instructions that, when executed by the processor, cause the processor to perform operations comprising receiving, from an orchestration platform, an inventory event that relates to instantiation of a service at a computing environment, wherein the inventory event is received with information that identifies the service that was instantiated, identifying, based on the information, the service that was instantiated, obtaining, based on information included in the inventory event, a tag set for the service, wherein the tag set comprises a plurality of security tags, wherein each of the plurality of security tags comprises a string that identifies a communications link associated with entities included in the service that was instantiated, and wherein obtaining the tag set comprises accessing recipes to identify a recipe associated with the service, determining, based on the recipe, the entities included in the service, and identifying, based on the entities, tags associated with the service, identifying, based on the tag set, policy rules associated with the plurality of security tags, wherein the policy rules are identified by accessing a policy database using identifiers associated with the plurality of security tags, and wherein the policy rules define security for the service that was instantiated, computing, based on the policy rules, a security policy for the service, and providing the security policy to the computing environment for implementation.

2. The system of claim 1, wherein obtaining the tag set comprises receiving the tag set with the inventory event.

3. The system of claim 1, wherein the recipe identifies the entities, and wherein the entities provide functionality of the service.

4. The system of claim 1, wherein the computer-executable instructions, when executed by the processor, cause the processor to perform operations further comprising:

receiving, from the orchestration platform, a tag event that indicates that a security tag of the plurality of security tags has been updated;

identifying services that have security policies that relate to the security tag, the services comprising the service;

updating security policies for the services identified, the security policies comprising the security policy; and providing an updated security policy to the computing environment for implementation.

5. The system of claim 4, wherein the security tag is updated based on feedback from the computing environment.

6. The system of claim 1, wherein the policy database is updated based on feedback from the computing environment.

7. The system of claim 1, wherein the computer-executable instructions, when executed by the processor, cause the processor to perform operations further comprising:

receiving, from the orchestration platform, a policy rule update event that indicates that one of the policy rules has been updated;

identifying tags that relate to the one of the policy rules;

identifying services that have security policies that relate to the one of the policy rules, the services comprising the service;

updating security policies for the services identified, the security policies comprising the security policy; and providing an updated security policy to the computing environment for implementation.

8. A method comprising:

receiving, from an orchestration platform and at a computing platform comprising a processor that executes a security management module, an inventory event that relates to instantiation of a service at a computing environment, wherein the inventory event is received with information that identifies the service that was instantiated;

identifying, by the processor and based on the information, the service that was instantiated;

obtaining, by the processor and based on information included in the inventory event, a tag set for the service, wherein the tag set comprises a plurality of security tags, wherein each of the plurality of security tags comprises a string that identifies a communications link associated with entities included in the service that was instantiated, and wherein obtaining the tag set comprises accessing recipes to identify a recipe associated with the service, determining, based on the recipe, the entities included in the service, and identifying, based on the entities, tags associated with the service;

identifying, by the processor and based on the tag set, policy rules associated with the plurality of security tags, wherein the policy rules are identified by accessing a policy database using identifiers associated with the plurality of security tags, and wherein the policy rules define security for the service that was instantiated;

computing, by the processor and based on the policy rules, a security policy for the service; and providing, by the processor, the security policy to the computing environment for implementation.

9. The method of claim 8, wherein obtaining the tag set comprises receiving the tag set with the inventory event.

10. The method of claim 8, wherein the recipe identifies the entities, and wherein the entities provide functionality of the service.

11. The method of claim 8, further comprising:

receiving, from the orchestration platform, a tag event that indicates that a security tag of the plurality of security tags has been updated;

identifying services that have security policies that relate to the security tag, the services comprising the service;

updating security policies for the services identified, the security policies comprising the security policy; and providing an updated security policy to the computing environment for implementation.

12. The method of claim 11, wherein the security tag is updated based on feedback from the computing environment.

13. The method of claim 8, wherein the policy database is updated based on feedback from the computing environment.

14. The method of claim 8, further comprising:

receiving, from the orchestration platform, a policy rule update event that indicates that one of the policy rules has been updated;

identifying tags that relate to the one of the policy rules;

identifying services that have security policies that relate to the one of the policy rules, the services comprising the service;

updating security policies for the services identified, the security policies comprising the security policy; and providing an updated security policy to the computing environment for implementation.

15. A computer storage medium having computer-executable instructions stored thereon that, when executed by a processor, cause the processor to perform operations comprising:
- receiving, from an orchestration platform, an inventory event that relates to instantiation of a service at a computing environment, wherein the inventory event is received with information that identifies the service that was instantiated;
- identifying, based on the information, the service that was instantiated;
- obtaining, based on information included in the inventory event, a tag set for the service, wherein the tag set comprises a plurality of security tags, wherein each of the plurality of security tags comprises a string that identifies a communications link associated with entities included in the service that was instantiated, and wherein obtaining the tag set comprises accessing recipes to identify a recipe associated with the service, determining, based on the recipe, the entities included in the service, and identifying, based on the entities, tags associated with the service;
- identifying, based on the tag set, policy rules associated with the plurality of security tags, wherein the policy rules are identified by accessing a policy database using identifiers associated with the plurality of security tags, and wherein the policy rules define security for the service that was instantiated;
- computing, based on the policy rules, a security policy for the service; and
- providing the security policy to the computing environment for implementation.

16. The computer storage medium of claim 15, wherein obtaining the tag set comprises receiving the tag set with the inventory event.

17. The computer storage medium of claim 15, wherein the recipe identifies the entities, and wherein the entities provide functionality of the service.

18. The computer storage medium of claim 15, wherein the computer-executable instructions, when executed by the processor, cause the processor to perform operations further comprising:
- receiving, from the orchestration platform, a tag event that indicates that a security tag of the plurality of security tags has been updated;
- identifying services that have security policies that relate to the security tag, the services comprising the service;
- updating security policies for the services identified, the security policies comprising the security policy; and
- providing an updated security policy to the computing environment for implementation.

19. The computer storage medium of claim 15, wherein the policy database is updated based on feedback from the computing environment.

20. The computer storage medium of claim 15, wherein the computer-executable instructions, when executed by the processor, cause the processor to perform operations further comprising:
- receiving, from the orchestration platform, a policy rule update event that indicates that one of the policy rules has been updated;
- identifying tags that relate to the one of the policy rules;
- identifying services that have security policies that relate to the one of the policy rules, the services comprising the service;
- updating security policies for the services identified, the security policies comprising the security policy; and
- providing an updated security policy to the computing environment for implementation.

* * * * *